(12) United States Patent
Strawa (10) Patent No.: US 7,531,775 B1
(45) Date of Patent: May 12, 2009

(54) PHOTOMETER FOR TRACKING A MOVING LIGHT SOURCE

(75) Inventor: Anthony W. Strawa, San Jose, CA (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 123 days.

(21) Appl. No.: 11/251,006

(22) Filed: Sep. 30, 2005

Related U.S. Application Data (60) Provisional application No. 60/690,430, filed on Jun. 13, 2005.

(51) Int. Cl.
*G01C 21/02* (2006.01)
*G01J 1/20* (2006.01)

(52) U.S. Cl. ............... 250/203.4; 250/200; 356/221
(58) Field of Classification Search ........... 356/221; 250/203.1–203.4, 203.6, 226
See application file for complete search history.

(56) References Cited

U.S. PATENT DOCUMENTS

| | | | | |
|---|---|---|---|---|
| 3,260,849 | A * | 7/1966 | Polye | 250/203.4 |
| 5,069,540 | A * | 12/1991 | Gonder | 359/853 |
| 5,093,574 | A * | 3/1992 | Pratt et al. | 250/339.02 |
| 6,462,889 | B1 * | 10/2002 | Jackson | 359/728 |
| 2003/0075212 | A1 * | 4/2003 | Chen | 136/246 |

OTHER PUBLICATIONS

Price, H. "Assessment of Parabolic Trough and Power Tower Solar Technology Cost and Performance Forecasts". Oct. 2003. National Renewable Energy Laboratory NREL/SR-550-34440. pp. 1-344.*
Schmid, Beat and Wehrli, Christopher. "High Precision Calibration of a Sun Photometer Using Langley Plots Performed at Jungfauhoch (3580 m) and Standard Irradiance Lamps," 1994 IEEE, pp. 2314-2316.*

(Continued)

*Primary Examiner*—Kara E Geisel
*Assistant Examiner*—Tara S Pajoohi
(74) *Attorney, Agent, or Firm*—John F. Schipper; Robert M. Padilla (57) ABSTRACT

A photometer that tracks a path of a moving light source with little or no motion of the photometer components. The system includes a non-moving, truncated paraboloid of revolution, having a paraboloid axis, a paraboloid axis, a small entrance aperture, a larger exit aperture and a light-reflecting inner surface, that receives and reflects light in a direction substantially parallel to the paraboloid axis. The system also includes a light processing filter to receive and process the redirected light, and to issue the processed, redirected light as processed light, and an array of light receiving elements, at least one of which receives and measures an associated intensity of a portion of the processed light. The system tracks a light source moving along a path and produces a corresponding curvilinear image of the light source path on the array of light receiving elements. Undesired light wavelengths from the light source may be removed by coating a selected portion of the reflecting inner surface or another light receiving surface with a coating that absorbs incident light in the undesired wavelength range.

34 Claims, 4 Drawing Sheets

Side View

OTHER PUBLICATIONS

Strawa, et al., A Sunphotometer for Planetary Studies, Presented to San Jose State University, Oct. 2004.

Strawa, et al., The Mars Sunphotometer Project, Presented to San Jose State University, Mar. 2005.

Strawa, et al., A Sunphotometer for Mars Atmosphere Studies, Proceedings of the 3rd International Planetary Probe Workshop, Jun. 27-Jul. 1, 2005, Annavyssos, Attica, Greece.

* cited by examiner

FIG. 5

PHOTOMETER FOR TRACKING A MOVING LIGHT SOURCE

ORIGIN OF THE INVENTION

This application claims the benefit of U.S. Provisional Application No. 60/690,430, filed 13 Jun. 2005.

This invention was made, in part, by one or more employees of the U.S. government. The U.S. government has the right to make, use and/or sell the invention described herein without payment of compensation therefor, including but not limited to payment of royalties.

FIELD OF THE INVENTION

This invention relates to a system, having no moving parts, that forms an image of a moving light source within a given region, such as a photometer for a moving sun.

BACKGROUND OF THE INVENTION

The interaction between the sun's energy and particulates in the atmosphere is recognized as one of the biggest driving forces for climate. Sunphotometers are commonly used on the Earth's surface, as well as on aircraft, to determine the solar energy attenuated by aerosol particles in the atmosphere. A suitably modified sunphotometer might be used to study the dynamics of an environment on another planet, satellite or other moving body, as well as on the Earth itself.

The information provided by such an instrument is used to determine the spatial and temporal distribution of aerosols in the atmosphere, their distribution of sizes, and column densities of some gas phase constituents. Typically, this instrument tracks the sun or other major light source to measure the direct solar attenuation and other relevant parameters. What is needed is an instrument that provides this information, has no moving parts, consumes little electrical power, other than what is required by light sensors and processing circuits to characterize the light received, and that is relatively small and lightweight, preferably with a mass no larger than about several kgm. Such an instrument would be ideal for studying an atmosphere of a planet.

SUMMARY OF THE INVENTION

Figure 1:
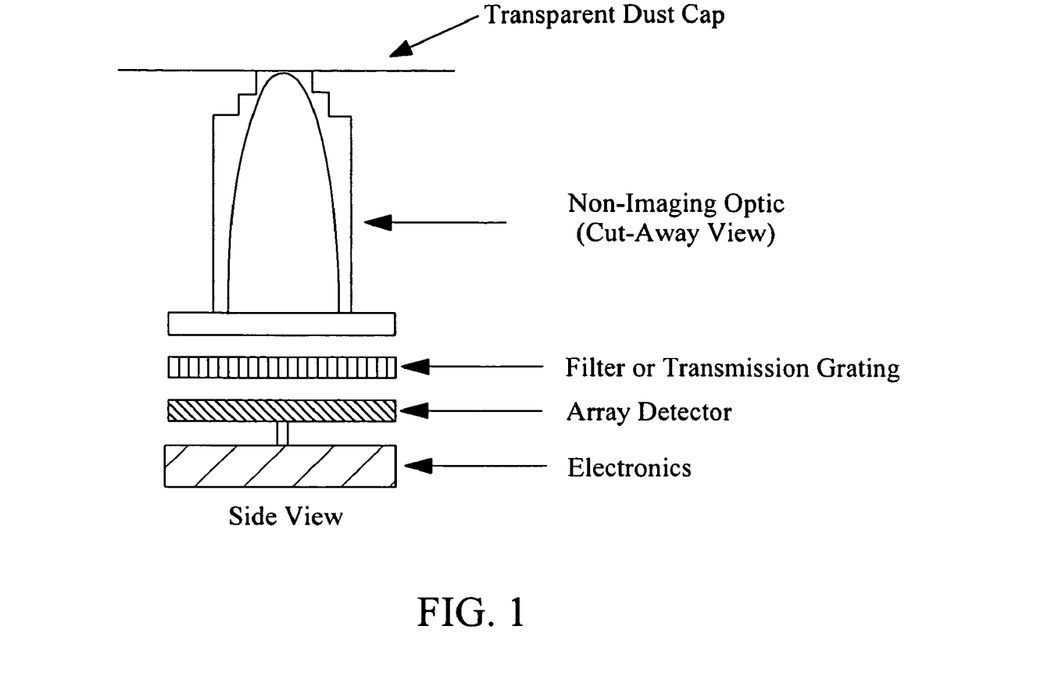
FIG. 1 schematically illustrates an embodiment of the invention.

These needs are met by the invention, illustrated schematically in FIG. 1, which provides a reformulated sun photometer that is small, that has no moving parts, and that consumes little electrical power in imaging the sun's rays on a selected region of a sensor array. The sensor array and associated signal processing electronics, which are part of a separate package, consume some power.

Incident light is received at a light reflecting (inner) surface, which is a truncated paraboloid of revolution having a paraboloid axis and a paraboloid focus, referred to herein as a "reflecting optic." Light arriving from a hemisphere (solid angle $2\pi$ steradians) enters the reflecting optic at an entrance aperture at or adjacent to the focus of the paraboloid and is captured by the optic. Most of this light is reflected by a light reflecting paraboloid inner surface, proceeds substantially parallel to the paraboloid axis, and is detected by an array detector located near an exit aperture. Each of the entrance aperture and the exit aperture is formed by intersection of the paraboloid with a plane substantially perpendicular to the paraboloid axis. Incident (non-reflected) light from a source of limited extent (referred to herein as a "sun) illuminates a limited area on the detector array, referred to herein as a "direct beam", on the detector array, as contrasted with "diffuse" illumination that emanates from light reflected from the atmosphere or from particulates therein. Both the direct and diffuse illumination may be reflected or not reflected before being received on the detector array. As the sun traverses a path in the sky over some time interval, the track of the sun can be traced on the detector array.

A sunphotometer is commonly used on the Earth's surface, as well as on aircraft, to determine the solar energy attenuated by aerosol particles in the atmosphere. This information is used to determine the spatial and temporal distribution of aerosols in the atmosphere and their distribution of sizes. Typically, these instruments track the sun to measure the direct solar attenuation. Our concept uses a combination of unique optics and a detector array (typically a CMOS, CCD or a CID array) to eliminate the moving parts inherent in a tracking sunphotometer and make our instrument much smaller, compact, and reliable. Data products would be downwelling flux, the direct-diffuse flux ratio, aerosol optical depth at multiple-wavelengths, cloud statistics, and an estimate of particle size. These measurements can be used to obtain an estimate of aerosol size distribution.

DESCRIPTION OF BEST MODES OF THE INVENTION

The invention uses a combination of unique optics and a detector array (e.g., a CCD, CID or CMOS array) to eliminate or minimize the moving parts inherent in a tracking sunphotometer or rotating shadowband sunphotometer and to provide a smaller, more compact, and more reliable and versatile instrument. Data obtainable from the instrument include total downwelling flux, the direct flux-total flux ratio, column abundance of gas phase constituents, aerosol optical depth at multiple-wavelengths, phase functions, cloud statistics, and an estimate of representative size of atmospheric particles. These measurements can be used to obtain an estimate of aerosol size distribution, refractive index and particle shape.

FIG. 1 schematically illustrates the main components of the instrument, including the processing electronics (optionally part of the instrument) and an associated location coordinate system (r,z). The first component of the system is a non-imaging optic that collimates light from a $2\pi$ steradian hemisphere through a filter or transmission grating and onto a detector array, including signal processing electronics. The electronics component performs basic image processing functions to produce the required data.

In one embodiment, the optic is a paraboloid surface of revolution with a highly reflective inner surface RS that reflects light entering a small entrance aperture, near the focus of the paraboloid (top of FIG. 1) onto subsequent system elements. Optionally, the reflective inner surface RS is coated with a substance that removes wavelengths in a selected range from the reflected light. Light is collected through the entrance aperture and exits onto the detector through a larger exit aperture. This approach is similar to, but distinguishable from, that used by F. P. J. Valero et al, "Radiative flux measurements in the troposphere," Appl. Optics, vol. 21 (1982) pp. 831-838, who appear to use a reflecting cone rather than a reflecting paraboloid for flux measurements from an aircraft, with possible multiple reflections from the cone surface.

Figure 2:
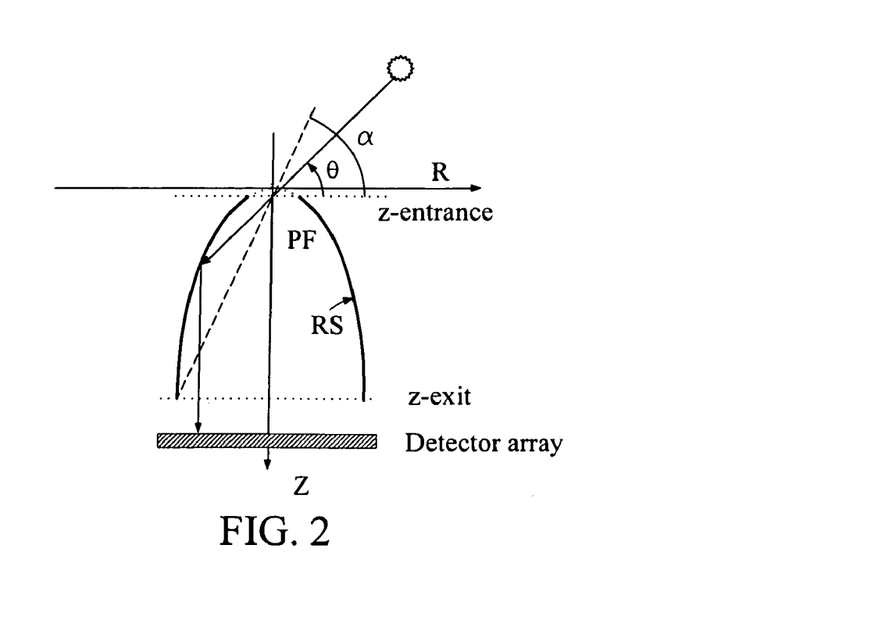
FIG. 2 illustrates the geometry of an embodiment of the invention.

Consider a cross section of a typical optic in FIG. 2. The actual optic used in the instrument will depend on the size and sensitivity of the detector array. The equation of the paraboloid in cylindrical coordinates in the coordinate system shown is $$z = kr^2 \ (k \neq 0), \quad (1)$$

where the paraboloid focus PF is at $(r,z)=(0, \frac{1}{4}k)$. The paraboloid has an exit aperture, measured along the (longitudinal) z-axis at $z=z_{exit}$.

Figure 3:
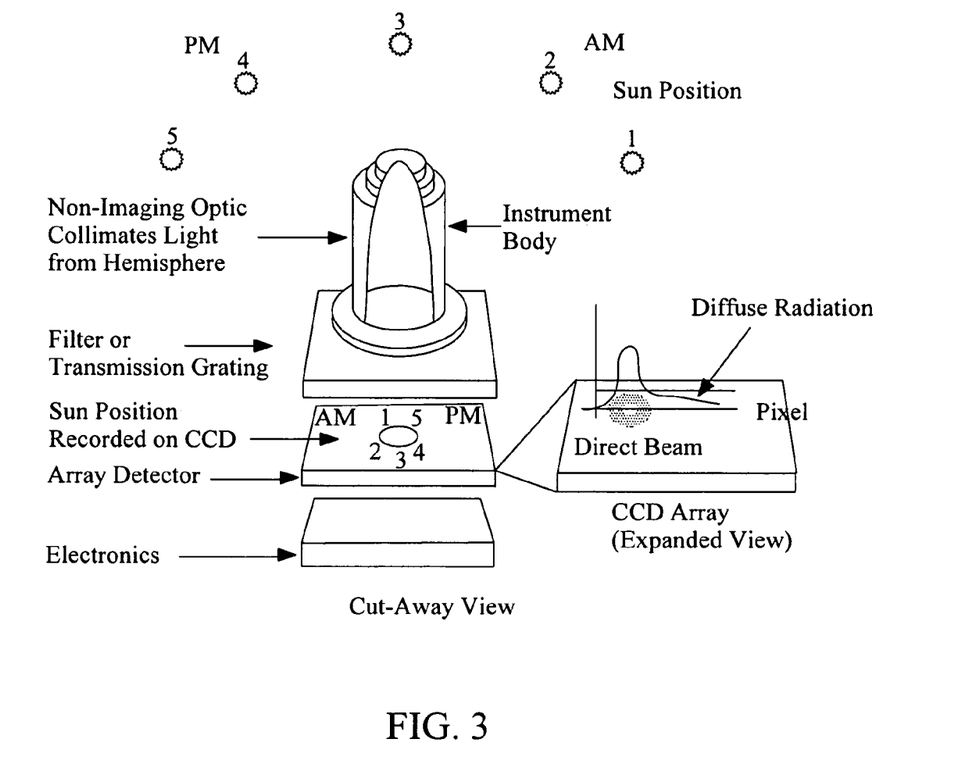
FIG. 3 illustrates a trace of a (moving) sun's image.

As the sun moves in its path, the sun's image traces an approximately elliptical pattern EP on the detector array, as illustrated in FIG. 3. This optical device is not imaging. However, a correspondence between the sun's present location and a location on the detector array that receives this image can be determined experimentally and theoretically.

To explain the operation of the instrument, consider a system, simplified by removing the dispersing optic, and consider a signal generated at the detector array as the sun traverses in the sky. The sun is sufficiently far away that light from the sun may be considered to be parallel. It is also assumed that the atmosphere is clear or has a uniformly distributed dust or haze layer. Where the polar zenith angle $\theta$ is always greater than $\alpha$, shown in FIG. 2, direct sunlight will only be reflected from the inner surface of the cone onto the array. In practice this condition is satisfied whenever the instrument is located at latitudes greater than a plus the tilt of the planetary axis. In FIG. 3, the sun rises in the morning on the a.m. side of the instrument marked in this Figure. Light from the sun, when it is at position 1 in the sky, enters the entrance aperture and is reflected onto the detector array at the position marked 1. The sun continues its traverse across the sky (positions 2 through 5) to the p.m. side of the detector and light is reflected onto the array forming a section of an ellipse as seen in FIG. 3. Every spot on the array can be mapped theoretically and experimentally to a position in the sky.

Figure 4A:
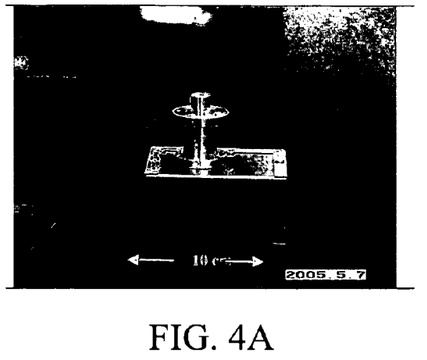
FIGS. 4A, 4B, 4C and 4D illustrate a prototype of the invention.
Figure 4B:
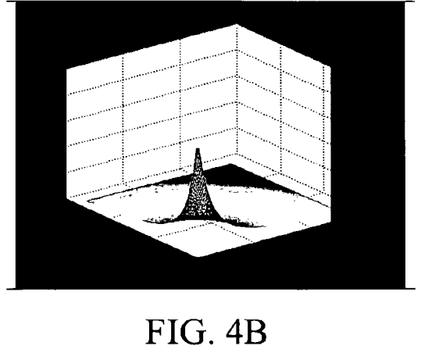
Figure 4C:
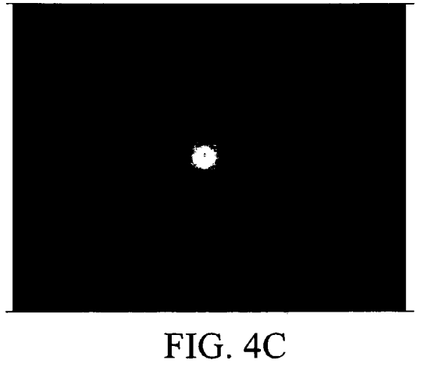
Figure 4D:
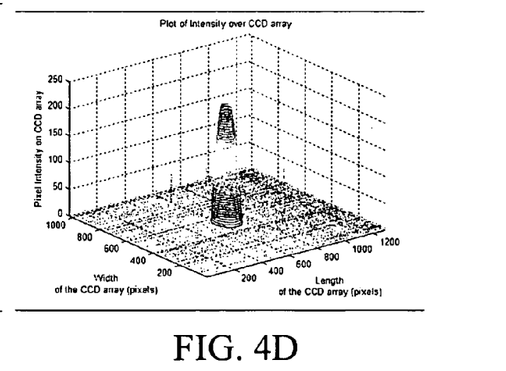

A prototype of this sunphotometer has been fabricated with a cone that is 25 mm high and has entrance and exit aperture diameters of 1 mm and 12.5 mm, respectively. The CCD array used is a Vitana PixeLink A653 monochrome array with 1.3 million pixels and 8-bit resolution. A picture of the prototype is shown in FIG. 4A. Overall dimensions are 10 cm by 10 cm by 7 cm. The array is connected to a laptop computer via firewire for data acquisition. A computer model of the instrument has been constructed to provide a theoretical mapping from a position on the detector array to a position in the sky. A plot showing the theoretical prediction of the detector array when the image is directly overhead is shown in FIG. 4B. An actual image of this geometry taken in the lab is shown in FIG. 4C, and a contour plot showing the intensity on the array is shown in FIG. 4D.

Determination of Downwelling Flux and Direct/Total Flux Ratio.

One issue that must be addressed is the dynamic range required of a detector array in order to obtain both the direct and diffuse flux simultaneously. An estimate of the required dynamic range can be obtained from the following analysis: It is assumed that that the detector array is 25 mm×25 mm with 1000 by 1000 pixels; the diameter of the cone entrance aperture is 1 mm and exit aperture is 25 mm. The total solar flux is 1000 Watt/m² with a direct to total ratio of 0.96. The area of a pixel, $A_{pix}$, is $0.625 \times 10^{-12}$ m²; the entrance area, $A_{en}$, is $0.79 \times 10^{-6}$ m²; and the exit aperture area, $A_{ex}$, is $493 \times 10^{-6}$ m². The direct flux, DIR, is 900 Watt/m² and the diffuse flux, DIF, is 40 Watt/m². The direct beam will illuminate the array in a spot that has the same area as the entrance aperture. The limiting aperture for the diffuse flux is the entrance aperture although the diffuse flux will illuminate the array with the area of the exit aperture. The number of pixels in the direct beam, $N_{dir}$, and the number of pixels in the diffuse beam, $N_{dif}$, can be estimated by $$N_{dir} = \frac{A_{en}}{A_{pix}} = 1264 \quad (2, 3)$$

$$N_{dif} = \frac{A_{ex}}{A_{pix}} = 788{,}800$$

The required dynamic range, DR, is the ratio of the irradiance on a pixel in the direct beam to the that of a pixel in the diffuse beam or $$DR = \frac{E_{pix,dir}}{E_{pix,dif}} = \frac{\frac{R \cdot A_{en}}{N_{dir}}}{\frac{F \cdot A_{en}}{N_{dif}}} = \frac{900 \cdot 788{,}800}{100 \cdot 1264} \approx 5616 \quad (4)$$

This corresponds to arrays with 14-bit resolution, which are available today. A 14-bit array has an electronic dynamic range EDR=20·log(DR)=75, which is sufficient for this purpose. Where a reduced resolution, such as 8 bits, is used, direct flux and diffuse flux cannot be adequately captured simultaneously.

Another option uses a Charge Induction Device (CID) array in which the exposure time of individual pixels can be controlled. CID arrays tend to be noisier than CCD arrays so that signal to noise ratio is a consideration. In a CID detector, each pixel can be read at any time individually during an exposure, whereas use of a CCD requires a fixed order of readouts. CCD and CID detector arrays are useful for visible light.

An alternative solution, for an array with less than 14-bit resolution, makes two exposures for the array. A first exposure has a short exposure time and captures the direct beam; and a second exposure has a long exposure time to capture the diffuse illumination.

FIG. 4C is a view looking down onto the array. The bright spot is the direct solar beam and the black area represents the diffuse radiation. Outside of the circle formed by the exit aperture of the cone, there is no direct or diffuse illumination. These pixels can be used to estimate the dark current or flux on the array. FIG. 4D is also a representation of the intensity of pixels along the line in FIG. 4C. Simple threshold techniques will identify the curvilinear arc of the direct beam. The centroid of the direct beam can be related to the location of the sun in the sky.

The diffuse light portion of the signal within the direct beam can be estimated by interpolation of the pixels adjacent to the direct beam. Then the direct and diffuse fluxes are determined by integrating the energy on the appropriate pixels and the direct-diffuse ratio is obtained. The sum of the direct and diffuse flux is referred to as the total downwelling flux.

Determination of Position and Orientation

Knowledge of the sun's position is required to calculate the air mass which is used in data analysis. If the position and orientation of the detector are not known a priori, the sun's position can be determined from the measurement(s) made by the instrument. Thus the system is able to compensate for deployment in situations where the instrument is not level.

Determination of the Optical Depth

The sunphotometer disclosed here measures the optical depth through application of the Lambert-Beer-Bouguer Law $$V(\lambda)=V_0(\lambda)\exp[-\tau(\lambda)m(\theta)] \quad (5)$$

where F and $F_0$ are the responses of the instrument at the surface and at the top of the atmosphere, respectively; $z(\lambda)$ is the total column optical depth due to scattering and absorption; and $m(\theta)$ is the air mass traversed by the direct solar beam through an intervening substance; $m(\theta)$ is approximately proportional to $\sec(\theta)$, where $\theta$ is the polar zenith angle.

Sunphotometers are typically calibrated in the lab with standard lamps or in the field using Langley plots (B. Schmid and C. Wehrli, "Comparison of Sun photometer calibration by use of the Langley technique and the standard lamp," Appl. Optics, vol. 34 (1995) p 4500). Lab calibration with standard lamps can lead to errors of 2 percent or more in the optical depth (j. Michalsky et al, "Multiyear measurements of aerosol optical depth in the Atmospheric Radiation Measurement and Quantitative Links programs," J. Geo. Res. Vol. 106 (2001) pp. 12099-12107). Careful Langley plot calibrations can achieve reduce the errors to 1 percent or less. Forming the logarithm of Eq. (5) provides a relation $$\ln V(\lambda)=\ln V_0(\lambda)-\tau(\lambda)m(\theta)] \quad (6)$$

When a series of measurements is taken over a range of $m(\theta)$ during which the optical depth remains constant, $V_0(\lambda)$ may be determined from the ordinate intercept of at least-squares fit when one plots the left hand side of Eq. (6) versus $m(\theta)$. This procedure is referred to as a Langley-plop calibration. Typically, these calibrations are performed during anti-cyclonic conditions, on a mountain top, in the morning before significant convection begins (B. Schmid and C. Wehrli, op cit; G. E. Shaw, "Error analysis of multi-wavelength sun photometry," Pure Appl. Geophys., vol, 114 (1976) pp. 1-14).

In the Field Calculations.

Planetary instruments are, of course, calibrated using all available methods prior to launch. However, detector and filter degradation are extremely difficult to account for, once the instrument is on the surface of a planet or satellite. One advantage of a sunphotometer is that methods have been developed that allow accurate calibrations to be performed in the field. For example, J. Michalskky et al, op cit, have developed a technique that selects the cleanest days from a series of daily measurements to perform Langley plot calibrations with an error of no more than 1 percent in optical depth. This technique will be adopted for the invention so that performance of the instrument can be monitored continuously on the surface. Any dust that might collect on the instrument protective dome would appear as a degradation in the detector and be compensated for accordingly.

Obtaining Spectral Information.

In the preceding discussion, it was assumed that the measurement was made broadband or at a single wavelength. The advanced sunphotometer can obtain useful information in either configuration. However, substantial information is available in the spectral signature of the direct beam and sunphotometry on Earth takes full advantage of the information in the direct solar spectrum. This sunphotometer is also capable of obtaining data similar to that of a traditional Earth-based sunphotometer that fulfills many science requirements. This can be made possible in a number of ways. In a first method, a filter wheel can be used to measure the spectral character of the direct and diffuse flux at selected wavelengths. This option requires a moving part but this moving part is contained within the instrument and not subject to the harsh outside environment. A second method is to use a transmission grating. As light passes through a transmission grating, a zero order spot is formed on the array at the position of the direct beam. The direct flux can be obtained by calibration. The first order refracted light contains the spectral information. This method has the advantage of being mechanically simple, however the retrieval of the spectral information will be complicated by the fact that the first order refracted light is combined with the diffuse light on the detector. A third option is to use an acousto-optic transmission grating. With this device, the direct and diffuse flux can be obtained at many wavelengths by changing the diffraction pattern on the device. This option requires more complex electronics and more power. Each of these methods will be explored to determine which best meets the scientific and technical requirements of the mission.

Detection of Clouds and Dust Devils: Determination of Cloud Properties.

Clouds and dust devils manifest themselves as bright areas on the dimmer diffuse background of the array. A cloud mask algorithm eliminates these areas from analysis of the phase function and diffuse flux calculations. This information can be useful, however, in characterizing the frequency of cloud and dust devil occurrences. Cloud size and height can be bounded by comparing the speed at which the cloud traverses the sky in angle to realistic cloud speeds known a priori and known velocity profiles. Additional information, such as particle characteristics, is available from the spectral properties of the cloud as the cloud obscures the sun, as long as the cloud is not optically thick.

Non-Perpendicular Receipt of Light Rays.

Figure 5:
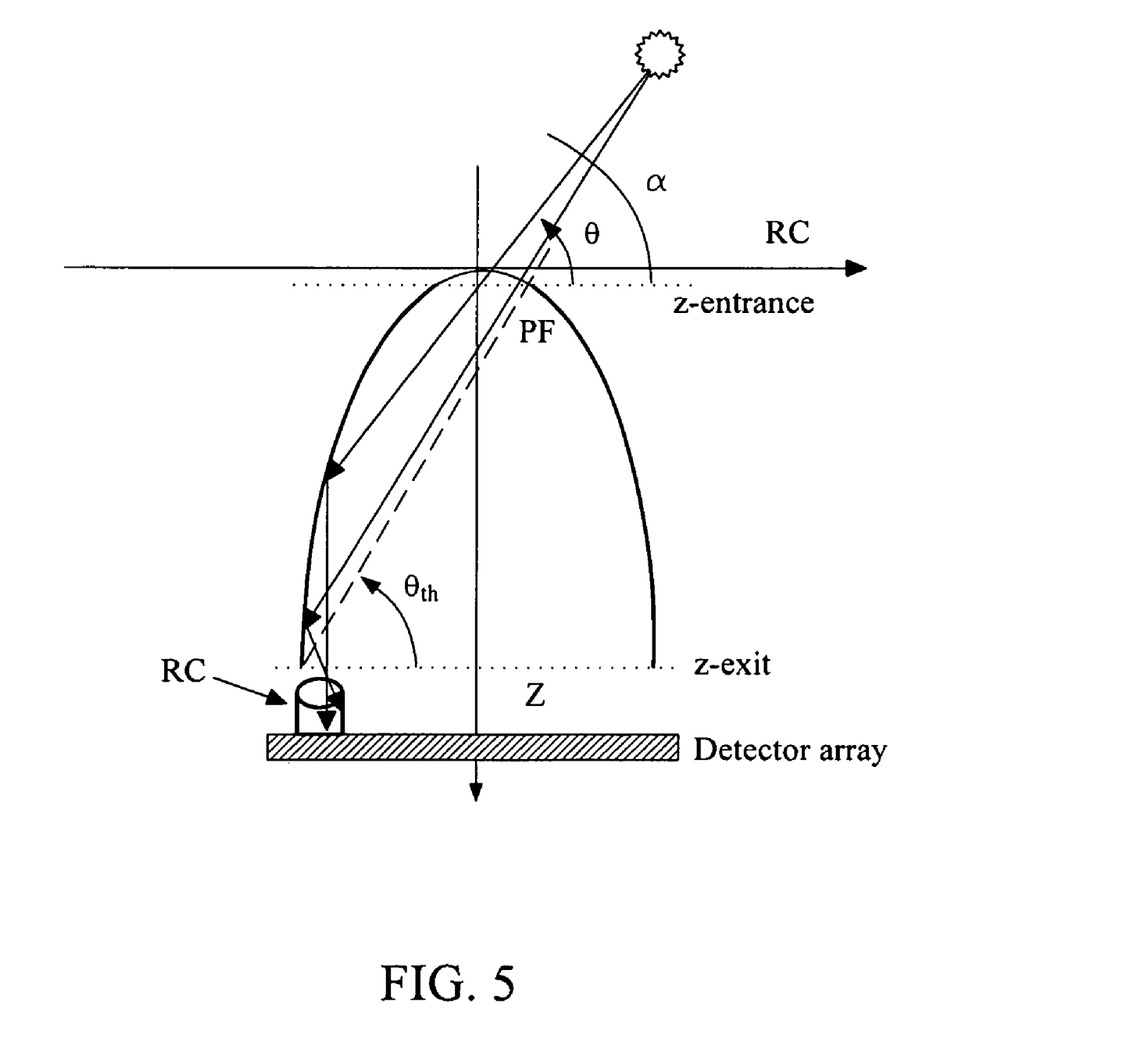
FIG. 5 illustrates the shape and use of a special purpose cone that is part of the system.

A light ray from the source passing through the focus PF arrives with an associated polar angle $\theta$, as illustrated in FIG. 2 or 5. Where $\theta$ is no greater than a threshold value $\theta_{thr}$, determined by the geometry in FIG. 5, this incident light ray will be reflected at most once from the inner surface RS, will be redirected substantially parallel to the longitudinal z-axis, and will be received substantially perpendicular to a plane surface of a detector array, with no geometric compensation being required for non-perpendicular receipt at the detector array. When a light ray arrives at the focus with a polar zenith angle $\theta$ no greater than $\theta_{thr}$ this ray is reflected at most once at the inner surface and is received directly and perpendicularly at the detector array.

When a light ray arrives at the focus PF with a polar zenith angle greater than $\theta_{thr}$, this ray will not be received perpendicularly at the detector array. This also occurs for a light ray that arrives at the entrance aperture with a polar zenith angle $\theta>\alpha$ and is received, without reflection, at the detector array.

A light ray that passes adjacent to, but not through, the focus PF may be reflected at the inner surface, may be redirected in a direction that is not substantially parallel to the z-axis, and may be received non-perpendicularly at the detector array. Optionally, these non-perpendicular rays may be minimized, but not wholly eliminated, by constructing a relatively tall right cylinder RC, having an inner surface with non-reflecting, radiation-absorbing material, with cylinder axis parallel to the z-axis, surrounding each pixel element, or a selected contiguous group of such pixel elements, on the detector array. Preferably, the cylinder RC has a transverse shape, viewed along the cylinder axis, that is substantially the same as the shape of the light receiving pixel element surrounded by the cylinder RC. This cylinder RC will suppress, by absorption or other action, most of the light rays that would otherwise arrive at the corresponding pixel element in a non-perpendicular direction. Alternatively, the inner surface of the cylinder RC has a material that preferentially absorbs incident light in one or more selected wavelength ranges that are received by the inner surface, and that preferentially reflects light in one or more other wavelength ranges that are not absorbed by the inner surface material, thus acting as a wavelength filter.

Light in an undesired wavelength range is removed from the incident light by coating a selected portion (including, but not limited to, all) of the light reflecting inner surface of the paraboloid with a substance that is substantially fully reflecting for wavelengths in a first selected (desired) wavelength range and is substantially fully absorbing for wavelengths in a second selected (undesired) wavelength range, where the first and second wavelength ranges have substantially no overlap.

What is claimed is:

1. A photometer that tracks a path of a moving light source with substantially no motion of the photometer components, the system comprising:
   a non-moving, truncated paraboloid of revolution having a paraboloid axis, a paraboloid focus and a light reflecting inner surface, to receive incident light that passes through and adjacent to the focus from a light source that moves on a continuous curve representing a known path of the light source, and to reflect a substantial portion of the incident light, with at most a single reflection, in a direction substantially parallel to the paraboloid axis;
   a light processing filter to receive, process and issue the reflected light as processed light; and
   an array of light receiving elements, at least one of which receives and measures an associated intensity of a portion of the processed light, located at a position that is spaced apart a positive distance from the focus.

2. The system of claim 1, wherein said array of light receiving elements comprises at least one of a charge coupled device, a charge induction device and a CMOS light detection device.

3. The system of claim 1, wherein said light reflecting inner surface is configured to receive light from substantially any location in a region having a solid angle of substantially $2\pi$ steradians.

4. The system of claim 1, wherein said light processing filter comprises a light transmission grating.

5. The system of claim 1, wherein at least one of said light processing filter and said array of light receiving elements comprises a computer that is programmed to distinguish between a direct light ray and a diffuse light ray.

6. The system of claim 1, wherein at least one of said light processing filter and said array of light receiving elements comprises a computer that is programmed to estimate a location of said light source.

7. The system of claim 1, wherein at least one of said light processing filter and said array of light receiving elements comprises a computer that is programmed to estimate an optical depth of at least one substance through which said incident light passes before reaching said paraboloid.

8. The system of claim 1, further comprising a calibration mechanism for calibrating at least one of said light processing filter and said array of light receiving elements.

9. The system of claim 8, wherein said calibration mechanism is configured to perform a Langley plot calibration.

10. The system of claim 1, wherein at least one of said light processing filter and said array of light receiving elements is configured to provide a mask for at least one cloud that is positioned between said light source and said paraboloid.

11. The system of claim 1, wherein said at least one light receiving element comprises a right cylinder, having a transverse shape that is substantially the same as the shape of said at least one light receiving element, having a cylinder axis that is substantially parallel to said paraboloid axis, and having an inner surface that is substantially absorbing for light received at the cylinder inner surface.

12. The system of claim 1, wherein said at least one light receiving element comprises a right cylinder, having a transverse shape that is substantially the same as the shape of said at least one light receiving element, having a cylinder axis that is substantially parallel to said paraboloid axis, and having an inner surface that is substantially absorbing for light in a selected wavelength range that is received at the cylinder inner surface.

13. The system of claim 1, wherein a selected portion of said light reflecting surface is coated with a substance that reflects substantially all light incident on said surface and having a wavelength in a first selected wavelength range and that is substantially absorbing for light incident on said surface and having a wavelength in a second selected wavelength range that does not overlap the first wavelength range.

14. The system of claim 1, wherein said reflecting inner surface of said paraboloid is coated with a substance that substantially removes wavelengths in at least one selected wavelength range from said light reflected incident light.

15. The system of claim 1, wherein said paraboloid receives at least two incident light rays from said light source as non-parallel light rays.

16. The system of claim 1, wherein said truncated paraboloid of revolution has an aperture, located adjacent to said focus, at a first distance from said focus, through which said incident light passes, and said array of light receiving elements is located at said positive distance, which is much larger than the first distance, from said focus.

17. The system of claim 16, wherein: (i) a first light beam enters into an interior of said paraboloid through said aperture, passes through said focus, is reflected at an interior surface of said paraboloid, thereafter propagates approximately parallel to said paraboloid axis, and is received by at least a first of said light receiving elements in said array; and (ii) a second light beam enters into the interior of said paraboloid through said aperture, does not pass through said focus, and is received by at least a second of said light receiving elements in said array.

18. A method of tracking a path of a moving light, the system comprising:
   positioning a non-moving, truncated paraboloid of revolution, having a paraboloid axis, a paraboloid focus and a light reflecting inner surface, to receive incident light that passes through and adjacent to the focus from a light source that moves on a continuous curve representing a light source known path, and reflecting a substantial portion of the incident light, with at most a single reflection, in a direction approximately parallel to the paraboloid axis;
   receiving, processing and issuing the redirected light as processed light at a light processing filter; and receiving and measuring an associated intensity of a portion of the processed light at least one of an array of light receiving elements, where the array is located at a position that is spaced apart a positive distance from the focus.

19. The method of claim 18, further comprising choosing said array of light receiving elements to comprise at least one of a charge coupled device, a charge induction device and a CMOS light detection device.

20. The method of claim 18, further comprising configuring said light reflecting inner surface to receive light from substantially any location in a region having a solid angle of substantially $2\pi$ steradians.

21. The method of claim 18, further comprising choosing said light processing filter to comprise a light transmission grating.

22. The method of claim 18, further comprising choosing said at least one light receiving element to comprise a right cylinder, having a transverse shape that is substantially the same as the shape of said at least one light receiving element, having a cylinder axis that is substantially parallel to said paraboloid axis, and having an inner surface that is substantially absorbing for light received at the cylinder inner surface.

23. The method of claim 18, further comprising choosing said at least one light receiving element to comprise a right cylinder, having a transverse shape that is substantially the same as the shape of said at least one light receiving element, having a cylinder axis that is substantially parallel to said paraboloid axis, and having an inner surface that is substantially absorbing for light in a selected wavelength range that is received at the cylinder inner surface.

24. The method of claim 18, further comprising providing a selected portion of said light reflecting surface with a substance that reflects substantially all light incident on said surface and having a wavelength in a first selected wavelength range and that is substantially absorbing for light incident on said surface and having a wavelength in a second selected wavelength range that does not overlap the first wavelength range.

25. The method of claim 18, further comprising providing at least one of said light processing filter and said array of light receiving elements with a computer that is programmed to distinguish between a direct light ray and a diffuse light ray.

26. The method of claim 18, further comprising providing at least one of said light processing filter and said array of light receiving elements with a computer that is programmed to estimate a location of said light source.

27. The method of claim 18, further comprising providing at least one of said light processing filter and said array of light receiving elements with a computer that is programmed to estimate an optical depth of at least one substance through which said incident light passes before reaching said paraboloid.

28. The method of claim 18, further comprising providing a calibration mechanism for calibrating at least one of said light processing filter and said array of light receiving elements.

29. The method of claim 28, further comprising configuring said calibration mechanism to perform a Langley plot calibration.

30. The method of claim 18, further comprising configuring at least one of said light processing filter and said array of light receiving elements to provide a mask for at least one cloud that is positioned between said light source and said paraboloid.

31. The method of claim 18, further comprising coating said reflecting inner surface of said paraboloid with a substance that substantially removes wavelengths in at least one selected wavelength range from said light reflected incident light.

32. The method of claim 18, further comprising receiving at least two incident light rays from said light source as non-parallel light rays.

33. The method of claim 18, further comprising providing said truncated paraboloid of revolution with an aperture, located adjacent to said focus, at a first distance from said focus, through which said incident light passes, and said array of light receiving elements is located at said positive distance, which is much larger than the first distance, from said focus.

34. The method of claim 33, further comprising
permitting (i) a first light beam to enter into an interior of said paraboloid through said aperture, to pass through said focus, to be reflected at an interior surface of said paraboloid, thereafter to propagate approximately parallel to said paraboloid axis, and to be received by at least a first of said light receiving elements in said array; and (ii) a second light beam to enter into the interior of said paraboloid through said aperture, to avoid passing through said focus, and to be received by at least a second of said light receiving elements in said array.

* * * * *